United States Patent

Shioya et al.

[19]

[11] Patent Number: 5,862,044
[45] Date of Patent: Jan. 19, 1999

[54] SWITCHING POWER SUPPLY UNIT

[75] Inventors: Masaki Shioya; Hideaki Matsumura; Takumi Ooe, all of Tokyo, Japan

[73] Assignee: Yokogawa Electric Corporation, Tokyo, Japan

[21] Appl. No.: 969,335

[22] Filed: Nov. 28, 1997

[30] Foreign Application Priority Data

Dec. 2, 1996 [JP] Japan ................................. 8-321579

[51] Int. Cl.$^6$ .......................... H02M 3/335; H02M 7/122
[52] U.S. Cl. ............................................... 363/21; 363/56
[58] Field of Search ................................. 363/20, 21, 56, 363/97, 131

[56] References Cited

U.S. PATENT DOCUMENTS

| 4,228,493 | 10/1980 | De Sartre et al. | 363/56 |
| 4,849,869 | 7/1989 | Tanuma et al. | 363/21 |
| 5,414,611 | 5/1995 | Muto et al. | 363/21 |
| 5,581,451 | 12/1996 | Ochiai | 363/21 |
| 5,675,485 | 10/1997 | Seong | 363/97 |

*Primary Examiner*—Matthew Nguyen
*Attorney, Agent, or Firm*—Moonray Kojima

[57] ABSTRACT

A switching power supply apparatus wherein a main converter turns "on" and "off" a DC current applied to a primary winding of a main transformer using a main switching element and outputs a main output voltage to the secondary side after rectifying and smoothing current induced in a secondary winding; an error amplifier generates an error voltage between the main output voltage and a first reference voltage; a PWM control circuit outputs an on-off control signal for the main switching element so that the error voltage is minimized; a photo coupler receives the error voltage and provides an output to the PWM control circuit; an over-voltage protection circuit generates an over-voltage protection signal when the main output voltage exceeds a second reference voltage; an on-off circuit outputs either a high level potential or a common level potential depending on whether the power is to be turned "on" or "off"; a shut down latch circuit outputs a shut down signal when the over-voltage protection signal represents an over-voltage state; and a shut down implementation circuit holds the input voltage to the photo-coupler at a value which suppresses input to the photo-coupler when a signal from the on-off circuit specifies power off or when the shut down signal from the shut down latch circuit is effective; whereby only a single isolator is required in the apparatus.

7 Claims, 2 Drawing Sheets

SWITCHING POWER SUPPLY UNIT

BACKGROUND OF THE INVENTION

1. Field of Invention

This invention relates to a switching power supply unit used for example with computers; and, more particularly, to improvements in such an unit that can start and stop the primary side switching element by start and stop signals generated on the secondary side, or by command from an over-voltage protection circuit for the output voltage located on the secondary side.

2. Description of the Prior Art

In conventional switching power supply units, a plurality of isolators are used to isolate the following signals: a feedback signal for output voltage stabilization; a signal from the over-voltage protection circuit; and a remote control signal that turns "on" and "off" the power using an external switch located on the secondary side. The isolators may comprise photo-couplers or transformers. For example, in Japan UM Application 1-79389 (1989), a single isolator is used to isolate the remote control signals from the over-voltage protection signals.

However, in that prior apparatus, since the isolator for isolating the feedback signal for output voltage stabilization is provided separately, more than one isolator is needed for the entire apparatus, thereby increasing the number and cost of the components. In addition, for such prior apparatus, if isolation is required between the primary side and the secondary side using a photo-coupler or a transformer, the printed wiring board is difficult to design because specified distances and clearances are required by industry safety standards.

In Japan Patent Application 4-156270 (1992), a signal isolator is used to isolate the above three types of signals. However, in that unit since the latch circuit for over-voltage protection is located on the primary side, the remote control signal is not able to release the latch and restart the power supply. In addition, the commercial power supply has to be turned "off" in order to release the latch. Thus, this prior unit cannot be used in some power supply applications.

SUMMARY OF THE INVENTION

Accordingly, it is an object of the invention to overcome the foregoing and other problems, deficiencies and disadvantages of the prior art.

Another object is to provide a switching power supply apparatus which can ensure isolation between the primary side and the secondary side using only a single isolator.

A further object is to provide such an apparatus, wherein stop and start signals are superimposed on the feedback signal used for output voltage stabilization.

The foregoing and other objects, features and advantages are attained by the invention which encompasses a switching power supply apparatus comprising:

a main converter which turns "on" and "off" a DC current applied to primary windings of a main transformer by a main switching element and outputs a main output voltage to the secondary side by rectifying and smoothing a current induced in the secondary windings of the main transformer;

an error amplifier which generates error voltages between the main output voltage and a first reference voltage;

a pulse width modulation control circuit that outputs a control signal to turn "on" and "off" a relevant main switching element so that an error voltage outputted from the error amplifier is minimized;

a photo-coupler which receives the error voltage outputted from the error amplifier as an input and outputs the error voltage to the pulse width modulation control circuit;

an over-voltage protection circuit that generates an over-voltage protection signal when the main output voltage exceeds a second reference voltage;

an on-off circuit that outputs either a high level potential or a common level potential depending on the remote control signal which determines whether to turn "on" or "off" the power;

a shut down latch circuit that outputs a shut down signal from an output terminal when the over-voltage protection signal from the over-voltage protection circuit represents an over-voltage state; and a shut down implementation circuit that holds the input voltage to the photo-coupler at a value which suppresses lighting of the photo-coupler when the remote control signal from the on-off circuit specifies a power off state or when the shut down signal from the shut down latch circuit is made effective.

According to the invention, the photo-coupler isolates the error voltage sent from the secondary side to the primary side. The shut down implementation circuit transmits the power off signal to the primary side using the signal fed back to the primary side by the photo-coupler when either the shut down signal or the remote control signal specifies a power off state. The shut down latch circuit maintains the power off state when the over-voltage protection signal is outputted.

DETAILED DESCRIPTION OF THE PREFERRED EMBODIMENTS

Figure 1:
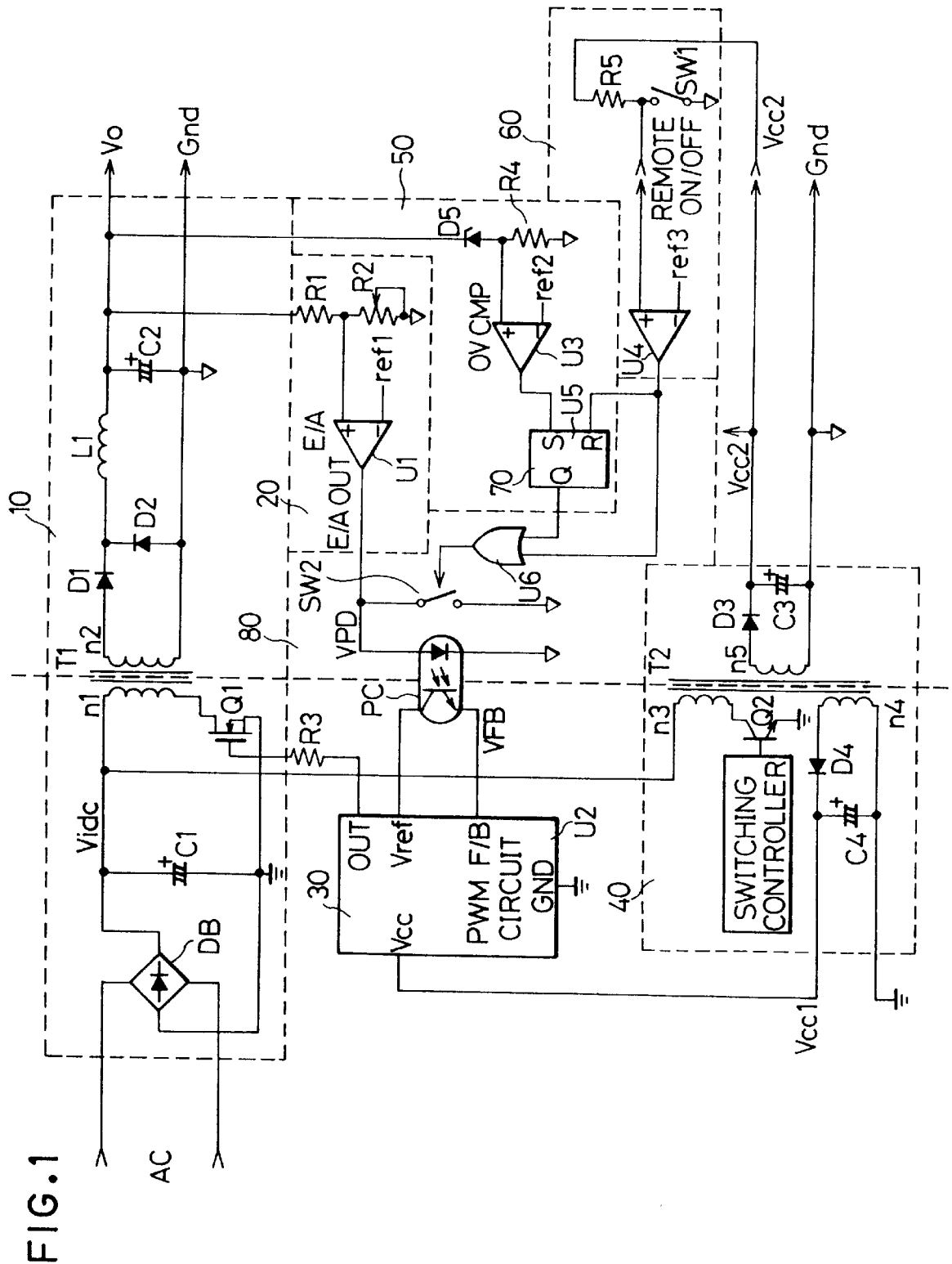
FIG. 1 is a circuit diagram depicting an illustrative embodiment of the invention.

In FIG. 1 main converter 10 turns "on" and "off" a DC current which is applied to the primary winding n1 of the main transformer T1 by main switching element Q1 and outputs a main output voltage Vo to the secondary side after rectifying and smoothing current induced in secondary winding n2. Since a commercial line AC power is used as an input power source, DC input voltage Vidc is obtained by rectifying the line voltage with diode bridge DB and smoothing the output from the diode bridge DB using an input capacitor C1. The main switching element Q1 uses an FET, but other elements can also be used, such as a PNP or NPN transistor. In the secondary side rectifying and smoothing circuit, the anode terminals of diodes D1 and D2 are connected respective ends of secondary winding n2, and the cathode terminals thereof are connected to each other and to output capacitor C2 through inductor L1.

Error amplifier 20 generates error voltages (that is error between the output voltage Vo and in this case first reference voltage Vref1) and employs an operational amplifier U1. Main output voltage Vo is divided in an appropriate ratio using divider resistors R1 and R2 and then the divided voltage is sent to operational amplifier U1 of error amplifier 20. The pulse width moduation (also called "PMW") control circuit 30 outputs a control signal that turns "on" and "off"

the main switching element Q1 so that the error voltage outputted from error amplifier 20 is minimized. The PMW control circuit 30 comprises a PWM circuit U2.

Auxiliary power supply 40 turns "on" and "off" the DC current supplied to primary winding n3 of auxiliary transformer T2 using auxiliary switching element Q2. The current induced in secondary winding n4 is outputted as auxiliary voltage Vcc for operating PWM control circuit 30 via the rectifying and smoothing circuit comprising diode D4 and capacitor C4. In addition, the current induced in secondary winding n5 is outputted as auxiliary voltage Vcc2 via the rectifying and smoothing circuit comprising diode D3 and capaciror C3.

Photo-coupler PC comprises a light receiving transistor and a light emitting diode, and receives an error voltage from error amplifier 20 on the light emitting diode and outputs an output signal from the light receiving transistor to PWM control circuit 30.

Over-voltage protection circuit 50 generates an over-voltage protection signal when main output voltage Vo exceeds a second reference voltage Vref2. The circuit 50 comprises an operational amplifier U3. Since main output voltage Vo is grounded through a series circuit comprising Zener diode D5 and resistor R4, a voltage generated across resistor R4 is inputted to the positive terminal of operational amplifier U3.

On-off circuit 60 outputs either a secondary auxiliary voltage Vcc2 or a common potential depending on the remote control signal sent from the secondary side. Operational amplifier U4 receives a voltage at a resistor R5 terminal on the switch SW1 as an input to its positive terminal and receives a third reference voltage Vref3 as an input to its negative terminal. Operational amplifier U4 outputs high or low level signals corresponding to the turning "on" or "off" of the remote control signal. Switch SW1 comprises a contact switch or a TTL circuit and defines the turning "on" or "off" state of the remote control signal. Thus, if the remote control signal is turned "on", switch SW1 is closed and the output from operational amplifier U4 becomes L, that is at a low level.

Shut down latch circuit 70 receives an over-voltage protection signal from operational amplifier U3 of over-voltage protection circuit 50 at its set (S) terminal, and receives a remote control signal from operational amplifier U4 of on-off circuit 60 at its reset (R) terminal and outputs a shut down signal at its output (Q) terminal. The latch circuit 70 comprises an RS flip-flop U5.

Shut down implementation circuit 80 holds the input voltage of photo-coupler PC at the L level when either the remote control signal from on-off circuit 60 or the shut down signal from shut down latch circuit 70 indicates a turn off of power. Switch SW2 is turned "on" and "off" by the output signal from OR device U6, to which the output signal from operational amplifier U4 and the output signal from shut down latch circuit 70 are inputted. When switch SW2 is turned "on", input voltage VPD of photo-coupler PC is maintained at the L level. If switch SW2,is turned "off", the input voltage VPD becomes equal to the output voltage E/A OUT from error amplifier 20.

Figure 2:
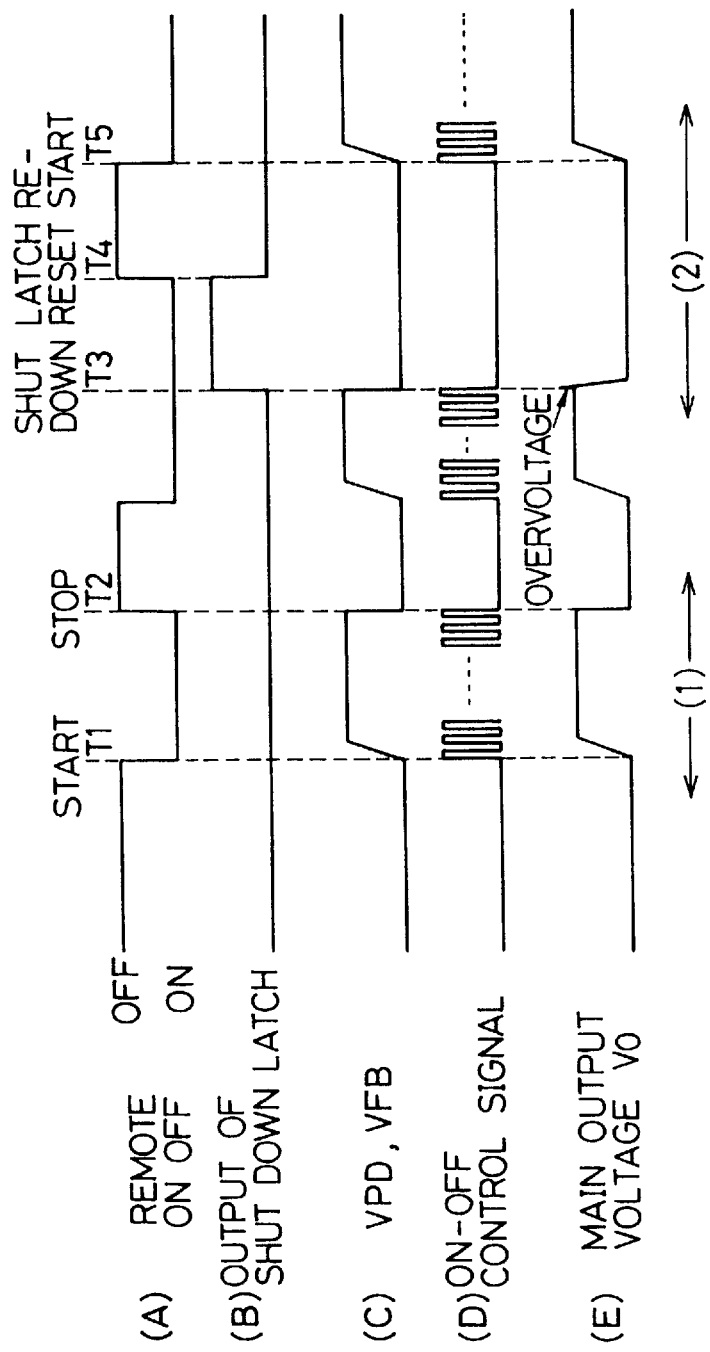
FIGS. 2(A)–2(E) are waveform diagrams depicting operation of the embodiment of FIG. 1 for both the "on" and "off" operations of the invention.

Operation of the embodiment of FIG. 1 will now be discussed with reference to FIGS. 2(A)–2(E) which depict waveforms useful in describing the operation of the embodiment depending on the turning "on" and "off" of the remote control signal. The wave shown in FIG. 2(A) represents the on-off state of the remote control signal. The wave shown in FIG. 2(B) represents the output of shut down latch circuit 70.

The wave shown in FIG. 2(C) represents the input voltage VPD and the output voltage VFB of the photo-coupler. The wave shown in FIG. 2(D) represents the on-off control signal. The wave shown in FIG. 2(E) represents the main voltage Vo.

Auxiliary power supply 40 is always operated regardless of the "on" or "off" state of the remote control signal during the time the commercial line AC power is "on." Assume that the auxiliary power supply 40 is started up by turning "on" the commercial line AC power, and assume further that the driving voltage Vcc of PWM control circuit 30 and the driving voltage Vcc2 of the secondary control circuit are supplied in a stable manner. Then, the following operation takes place.

First, when the remote control signal changes from "off" H level to "on" L level at the instant of time T1 (see FIG. 2(A)), the output voltage of operational amplifier U4 of on-off circuit 60 changes to the L level. At the same time, switch SW2 is opened, and the output voltage of operational amplifier U1 of error amplifier 20 is supplied to the photo-coupler PC as input voltage VPD.(see FIG. 2(C)). If the output voltage VFB of the photo-coupler PC is below a predetermined threshold voltage Vth, PWM control circuit 30 does not produce pulses from its OUT terminal. As the output voltage VFB becomes higher than the threshold voltage Vth, PWM control circuit 30 operates so that the duty ratio of pulses from the OUT terminal becomes greater. Thus, when error voltage signal E/A OUT from error amplifier 20 is starting to be transmitted to photo-coupler PC, the emitter voltage VFB of the light receiving transistor of the photo-coupler PC begins to rise from 0 V. When this emitter voltage VFB exceeds the threshold voltage Vth, the on-off control signal is outputted from the OUT terminal. (see FIG. 2(D)) Then, main converter 10 is operated and main output voltage Vo rises (see FIG. 2(E)).

In FIG. 2(C), input voltage VPD and output voltage VFB of the photo-coupler PC and main output voltage Vo (see (FIG. 2(E)) increase as shown by the slope. This means that the loading of a so called slow start circuit to the secondary side may be taken into consideration. By providing a slow start circuit, a so called rush current is prevented from occurring. But, on the other hand, error voltage E/A OUT from error amplifier 20 results in a gentl rise upon start up.

Next, when the remoto control signal is turned "off" at the instant T2 (see FIG. 2(A)), the output voltage from operational amplifier U4 of on-off circuit 60 is changed to the H level, and switch SW2 is closed, and the input voltage VPD of photo-coupler PC is clamped at the L level. Since the output voltage VFB of the photo-coupler PC decreases below a predetermined threshold voltage Vth, the duty ratio of the on-off control signal at the OUT terminal becomes zero and the main converter 10 is stopped.

Assume that an over-voltage exists in main output voltage Vo at the instant T3 (see FIG. 2(A)). Over-voltage protection circuit 50 detects the over voltage and sets shut down latch circuit 70 (see FIG. 2(B)). Then, input voltage VPD of the photo-coupler PC is clamped to the L level and main converter 10 is stopped until shut down latch circuit 70 is reset (e.g. at time T4 in FIG. 2(A)). During the stopped period of the main converter 10, any faults which may have caused the over-voltage can be found and removed.

When the remote control signal is turned "off" at the instant T4 (see FIG. 2(A)), the output voltage from operational amplifier U4 of on-off circuit 60 is changed to the H level and the shut down latch circuit 70 is reset (see FIG. 2(B)). After that, if the remote control signal is turned "on" at the instant T5, the main converter 10 is restarted.

In the embodiment, the output from operational amplifier U4 of on-off circuit 60 is connected to the reset terminal of the shut down latch circuit 70. However, if a remote control signal is not required or not desired to rest the shut down latch circuit 70, the outut from operatioal amplifier U4 of on-off circuit 60 need not be connected to the reset terminal of shut down latch circuit 70. In addition, auxiliary power 40 is not limited to its use with an auxiliary transformer T2. Any circuit can be used so long as it supplies a DC voltage Vcc2 independent of the main converter 10. For example, a DC voltage source, such as a battery, can be used.

An outstanding advantage of the invention lies in the fact that only a single photo-coupler is needed as an isolator in the entire switching power supply apparatus. This is because in the invention, a unique superimposing of the over-voltage protection signal and the remote control signal on the feedback signal of the output voltage is featured. Accordingly, a highly reliable and economical switching power supply apparatus is provided by the invention.

Another advantage is that if the auxiliary power supply is provided independent of the main converter, the power to operate the over-voltage protection circuit 50, on-off circuit 60, shut down latch circuit 70, and shut down implementation circuit 80 can be ensured even if the main converter is not operated. Thus, the power supply unit can readily and smoothly handle the remote control signal and the shut down signal.

Moreover, advantageously, the invention apparatus can use a shut down latch circuit 70 which is reset by a remote control signal. The latching status of the shut down latch circuit 70, which maintains the "off" state of the power supply when the over-voltage protection signal is generated, can be released by using the on-off circuit 60 according to directios from the remote control signal transmitted from the secondary side, even when the input voltage on the primary side is being supplied. Thus, the power supply can be readily restarted in a simple manner when the over-voltage circuit is operated.

The foregoing is illustrative of the principles of the invention. Numerous extensions and modifications thereof can be provided. All such extensions and modifications are to be considered to be within the spirit and scope of the invention.

What is claimed is:

1. A switching power supply apparatus comprising:

a main transformer (T1) comprising a primary winding (n1) and a secondary winding (n2);

a main switching element (Q1);

a main converter (10) that turns "on" and "off" a DC current applied to said primary winding of said main transformer using said main switching element and outputs a main output voltage by rectifying and smoothing current induced in said secondary winding of said main transformer;

an error amplifier (20) that generates an error voltage between said main output voltage and a first reference voltage (Vref1);

a PWM control circuit (30) that outputs an on-off control signal for said main switching element so that said error voltage outputted from said error amplifier is minimized;

a photo-coupler (PC) that receives said error voltage from said error amplifier and outputs said error voltage to said PWM control circuit;

an over-voltage protection circuit (50) that generates an over-voltage protection signal when said main output voltage exceeds a second reference voltage (Vref2);

an on-off circuit (60) that outputs either a high level potential or a common level potential depending on whether the power is to be turned "on" or "off";

a shut down latch circuit (70) that outputs a shut down signal from an output terminal thereof when the over-voltage protection signal from said over-voltage protection circuit represents an over voltage state; and a shut down implementation circuit (80) that holds an input voltage of said photo-coupler at a value which suppresses input to said photo-coupler when said potential level from said on-off circuit specifies a power off state or when the shut down signal from said shut down latch circuit is provided.

2. The apparatus of claim 1, further comprising an auxiliary power supply independent of said main converter for supplying at least said high level potential.

3. The apparatus of claim 2, further comprising an auxiliary transformer comprising a primary winding and a secondary winding, an auxiliary switching element, means for rectifying and smoothing current in said secondary winding of said auxiliary transformer, and means for providing power from said auxiliary power supply to said primary winding of said auxiliary transformer using said auxiliary switching element, whereby auxiliary voltage is produced in said secondary winding of said auxiliary transformer, and wherein said auxiliary voltage is provided to said PWM control circuit.

4. The apparatus of claim 1, further comprising means for providing a remote control signal; and wherein said shut down latch circuit is reset by said remote control signal.

5. The apparatus of claim 4, wherein said shut down latch circuit comprises a set terminal, a reset terminal, and an output terminal; and further comprising means for supplying said over-voltage protection signal from said over-voltage protection circuit to said set terminal of said shut down latch circuit, means for supplying said remote control signal to said reset terminal of said shut down latch circuit; and wherein said shut down latch circuit provides a shut down signal at said output terminal thereof.

6. The apparatus of claim 1, wherein said shut down latch circuit comprises a set terminal, a reset terminal, and an output terminal, and an RS flip-flop circuit; and further comprising means for supplying said over-voltage protection signal from said over-voltage protection circuit to said set terminal; means for supplying a remote control signal to said reset terminal; and wherein said shut down latch circuit provides a shut down output signal at said output terminal thereof.

7. The apparatus of claim 1, wherein said shut down implementation circuit comprises an OR circuit and a switching element; and further comprising means for providing a remote control signal to said OR circuit; means for controlling the "on" or "off" state of said switching element under control of said OR circuit; and means under control of said OR circuit for connecting said photo-coupler to a common terminal.

* * * * *